Sept. 1, 1931. V. KRICK 1,821,220

STEERING WHEEL OPERATED HEADLIGHT

Filed Sept. 29, 1930

INVENTOR,
Vincent Krick;
BY F. E. Maynard
ATTORNEY

Patented Sept. 1, 1931

1,821,220

UNITED STATES PATENT OFFICE

VINCENT KRICK, OF LOS ANGELES, CALIFORNIA

STEERING WHEEL OPERATED HEADLIGHT

Application filed September 29, 1930. Serial No. 485,151.

This invention relates to headlights of vehicles and more especially to headlights which are mounted to swing on vertical axes concurrently with and by operation of the steering train from the hand wheel to the front caster or pilot wheels.

It has heretofore been proposed to dirigibly operate the headlights of automotive road vehicles by various contrivances which for one reason or another have not been generally adopted. One reason is that because of the necessity for easy turning action of the lamps and required articulation of link-train mechanism play of the parts has caused a rattle sound while the vehicle is in motion at normal driving speeds, say forty miles an hour. Another objection is that because of play the headlights will oscillate to a conspicuous degree very noticeable when the beam is generated.

It is, therefore, an object of this invention to provide a highly effective, operative connection between the drag-link of the usual steering system and the headlights, and especially to provide a headlight bearing and turning means which, while allowing the headlight to swing with minimum resistance will be totally free of undesired lost play and possess the steadiness, practically, of a fixed part.

The invention consists in certain advancements in this art as set forth in the ensuing disclosure and having, with the above, additional objects and advantages, and whose construction, combination and details of means, and the manner of operation will be made manifest in the description of the herewith illustrative embodiment; it being understood that modifications, variations and adaptations may be resorted to within the scope, principle and spirit of the invention as it is more directly claimed hereinafter.

Figure 1:
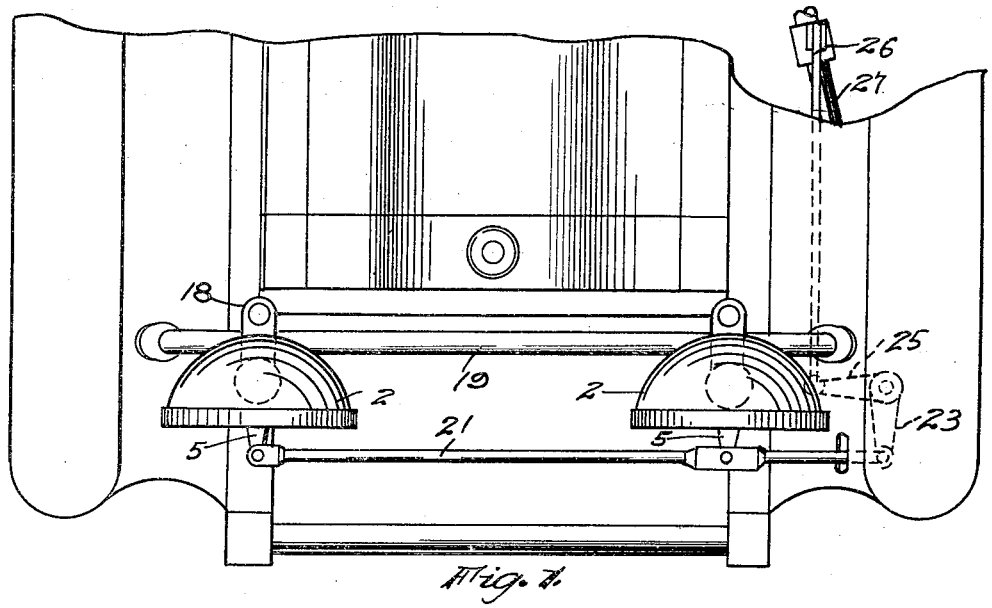
Figure 1 is a plan of the apparatus as applied.
Figure 2:
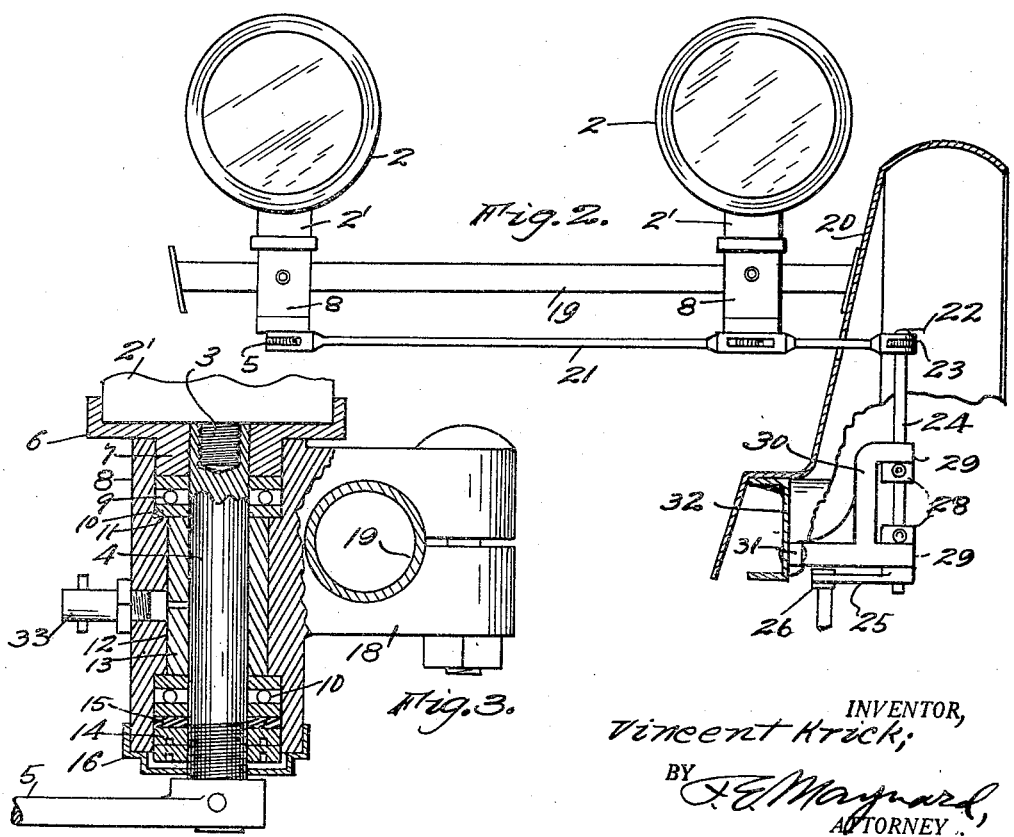
Figure 2 is a front elevation thereof.
Figure 3:
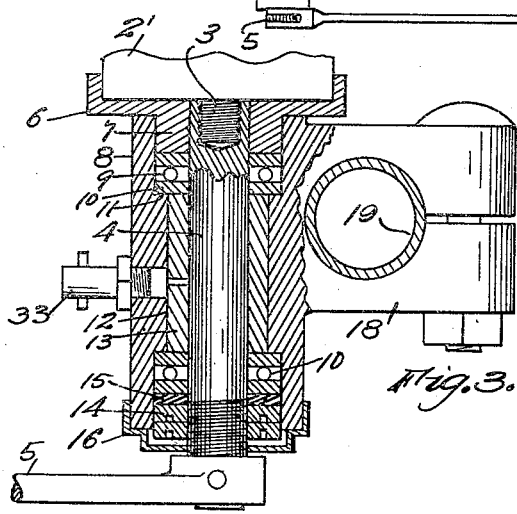
Figure 3 is an axial section of a lamp bearing.

As here disclosed the headlights 2 have base hubs 2' provided with spindles 3 which solidly screw into vertical rock-shafts 4 having forwardly projecting lever arms 5 pinned or otherwise secured on their lower ends.

The hub 2' rests in a turntable 6 having a boss 7 fitted on the upper end of the shaft 4 and turnably fitting in the upper end of a bearing box having an elongated body 8 bored at each end to receive sets of ball bearings 9 and races 10 which set firmly on end shoulders 11 of the reduced axial bore 12 in which is set a bronze bushing 13 terminating at the mentioned shoulders.

The lower part of the shaft 4 is threaded to receive lock nuts 14 which compress a packing washer 15 hard against the near ball race 10 and at the same time draw the headlight hub 2' tight down on the turntable and thus, thereby, to the upper race bearing. The ball bearings permit free turning of the headlight by the lever arm 5 and the elongated bushing 13 gives a true axial guide and prevents wobble not eliminated by ball-bearing means.

To the bottom of the bearing box is secured a finish boot 16 concealing the bottom nut assembly.

Each lamp carrying box 8 has a rearward split-clamp lug 18 bored to receive a substantial cross-bar 19 suitably supported, as by anchoring to the fender panels 20; though any desired mount for the boxes may be appropriated.

The lamp levers 5 are pivotally attached to a cross-link 21 having one end passed through the relative fender and pivoted at 22 to the forwardly projecting arm 23 of a crank-shaft 24 having on its lower end a lateral draft arm 25 connected to the fore end of a secondary draft-link 26 which is connected well back on the main steering draft-link 27, common in road motor vehicles for castering the front wheels (not shown).

The crank-shaft 24 is provided with spaced collars 28 adjustable against bearing lands 29 of a bracket 30 having a lateral foot 31 suitably secured to a solid part of the chassis 32.

In all adaptations the link 26 and the bracket 30 will be designed for installation in full clearance of all adjacent operating elements of the running gear.

From the above it will be seen that when the main draft link 27 is actuated its endwise movement will be transmitted by link 26 to the crank shaft and from this to the lamp connecting link 21 and thereby cause the lamps 2 to turn a desired degree simultaneously and co-directionally with caster action of the pilot wheels of the vehicle.

A lubricating device 33 enables introduction of grease to the bearing from time to time.

What is claimed is:

The combination with a road vehicle having a draft-link for its pilot wheels and a set of headlights which are mounted to swing on vertical axes, of springless means to support and to turn the headlights and including a box bearing for each headlight, a turntable with a boss counter sunk and fitting in the top of the box, a ball bearing wholly sunk in said box top and supporting the boss, a rock-shaft having a steadying bearing in the box to eliminate side wobble and having an operating arm on its lower end, means connecting the base of the headlight to said shaft, a ball bearing countersunk in the bottom of the box, a fiber packing ring under the bearing, and lock nuts on the shaft to draw the base onto said turntable and the latter thereby onto the upper ball bearing; said nuts reacting on the lower bearing through the fiber packing ring.

VINCENT KRICK.